(12) United States Patent
Lee (10) Patent No.: US 11,285,931 B2
(45) Date of Patent: Mar. 29, 2022

(54) ELECTRIC BOOSTER

(71) Applicant: HYUNDAI MOBIS CO., LTD., Seoul (KR)

(72) Inventor: So Dam Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 80 days.

(21) Appl. No.: 16/820,943

(22) Filed: Mar. 17, 2020

(65) Prior Publication Data
US 2020/0298813 A1    Sep. 24, 2020

(30) Foreign Application Priority Data

Mar. 19, 2019    (KR) ..................... 10-2019-0031090

(51) Int. Cl.
*B60T 13/74* (2006.01)
*B60T 13/14* (2006.01)
*B60T 13/66* (2006.01)

(52) U.S. Cl.
CPC .......... *B60T 13/745* (2013.01); *B60T 13/145* (2013.01); *B60T 13/66* (2013.01)

(58) Field of Classification Search
CPC .. B60T 13/74; B60T 13/745; F16H 2025/204; F16H 25/2021
See application file for complete search history.

(56) References Cited

U.S. PATENT DOCUMENTS

| | | | | |
|---|---|---|---|---|
| 6,079,797 A * | 6/2000 | Ganzel | ................... | B60T 8/4018 303/116.1 |
| 6,490,942 B1 * | 12/2002 | Meyer | ................... | B60N 2/1615 297/344.14 |
| 7,562,594 B2 * | 7/2009 | Nagai | ................. | F16H 25/2015 74/89.23 |
| 8,656,798 B2 * | 2/2014 | Kawahara | ............... | F16H 25/20 74/89.32 |
| 8,893,627 B2 * | 11/2014 | Hwu | ................... | F16H 25/2015 108/20 |
| 2012/0248862 A1 * | 10/2012 | Ohnishi | ................. | B60T 8/4081 303/20 |
| 2018/0029575 A1 * | 2/2018 | Malwitz | ................... | F16D 65/14 |
| 2019/0100172 A1 * | 4/2019 | Lee | ................... | F16H 25/2015 |
| 2020/0331446 A1 * | 10/2020 | Yun | ........................ | B60T 8/3265 |
| 2020/0340560 A1 * | 10/2020 | Oehler | ................. | B60T 13/746 |
| 2020/0340563 A1 * | 10/2020 | Boehm | ................. | B60T 13/746 |
| 2021/0018079 A1 * | 1/2021 | Winkler | .................... | F04B 9/02 |

FOREIGN PATENT DOCUMENTS

KR    10-2012-0045597    5/2012

* cited by examiner

*Primary Examiner* — Bradley T King
(74) *Attorney, Agent, or Firm* — H.C. Park & Associates, PLC (57) ABSTRACT

An electric booster including: a motor; a booster body coupled to the motor; a bolt screw rotatably installed in the booster body, connected to the motor, and rotated by the motor; a buffer mounted in the booster body and made of a material different from the booster body; and a nut screw restricted from rotating by the buffer, and screwed to the bolt screw so as to be linearly moved in the longitudinal direction of the bolt screw.

7 Claims, 7 Drawing Sheets

ELECTRIC BOOSTER

CROSS-REFERENCE TO RELATED APPLICATION

This application claims priority from and the benefit of Korean Patent Application No. 10-2019-0031090, filed on Mar. 19, 2019, which is hereby incorporated by reference for all purposes as if set forth herein.

BACKGROUND

Field

Exemplary embodiments of the present invention relate to an electric booster for an automotive braking system, and more particularly, to an electric booster which can return a part to a preset position when a braking force is released, and prevent damage between parts and noise generation.

Discussion of the Background

An electric booster for an automotive braking system drives a motor to pressurize a master cylinder, and the master cylinder generates braking pressure. Such an electric booster includes a motor, a bolt screw rotated by the motor, a nut screw linearly moved by the bolt screw, and a piston configured to generate braking pressure while being moved by the nut screw. The nut screw is linearly moved along a groove formed in a booster body, while being restricted from rotating.

In the related art, when the motor generates braking force generation torque, the torque is transferred to the bolt screw from a motor shaft. The bolt screw is rotated by the transferred torque, and the nut screw is moved forward in the longitudinal direction of the bolt screw while restricted from rotating. The translational motion of the nut screw generates a braking force.

When braking force release torque is generated after the braking force is generated, the bolt screw generates counter torque, and the nut screw is reversed to release the braking force. At this time, the nut screw needs to be reversed and returned to the original position. However, when the bolt screw is excessively rotated due to abrasion of the booster body, the nut screw may deviate from the original position. Furthermore, a collision between the booster body and the nut screw returned to the original position may generate noise. Therefore, there is a need for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to an electric booster which can return a part to a preset position when a braking force is released, and prevent damage between parts and noise generation.

In an exemplary embodiment, an electric booster includes: a motor driven as power is applied; a booster body coupled to the motor; a bolt screw rotatably installed in the booster body, connected to the motor, and rotated by power from the motor; a buffer mounted in the booster body and made of a material different from the booster body; and a nut screw restricted from rotating by the buffer, and screwed to the bolt screw so as to be linearly moved in the longitudinal direction of the bolt screw.

The buffer may include: a buffer body mounted on the body; and a rotation restriction part protruding from the buffer body, and configured to restrict the rotation of the nut screw.

The buffer may include a stopper part formed on the rotation restriction part, and configured to restrict the nut screw from moving beyond a preset range on the bolt screw.

The booster body may be made of a metallic material, and the buffer may be made of a plastic material.

The nut screw may include: a nut body screwed to the bolt screw; and a guide protrusion protruding from the outer surface of the nut body, and inserted into the rotation restriction part.

The buffer may be disposed at a plurality of positions of the booster body, and the number of the guide protrusions may be equal to the number of the buffers.

The bolt screw may include: a bolt connection part connected to the motor and rotated by power from the motor; a bolt-embedded part extended from the bolt connection part, and rotatably mounted on the booster body so as to be restricted from moving; and a bolt screw thread part extended from the bolt-embedded part and screwed to the nut screw.

The booster body may have a buffer mounting part convexly formed in the longitudinal direction of the nut screw, and the buffer body may be forced into the buffer mounting part.

In accordance with exemplary embodiments of the present invention, the buffer may prevent a collision between the nut screw and the booster body, such that the abrasion and damage of the nut screw and the booster body can be reduced to extend the lifetime of the electric booster.

Furthermore, the buffer can reduce noise generation by preventing a collision between the nut screw and the booster body, thereby providing a comfortable ride to a passenger in a vehicle.

Furthermore, the buffer may restrict the movement of the nut screw such that the nut screw can be prevented from excessively moving and returned to the preset position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, an electric booster will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Referring to FIGS. 1 to 7, the electric booster in accordance with the embodiment of the present invention includes a motor 10, a booster body 20, a bolt screw 30, a buffer 40, and a nut screw 50.

The motor 10 is driven as power is applied, and rotates the bolt screw 30 in one direction or the other direction. The booster body 20 is coupled to the motor 10, and houses the bolt screw 30, the buffer 40 and the nut screw 50 therein.

The booster body 20 includes a bolt movement path 21 and a buffer mounting part 23.

The bolt movement path 21 is formed through the booster body 20, and provides a space in which the bolt screw 30 can be rotated and the nut screw 50 can be moved in the longitudinal direction of the bolt screw 30.

The number of the buffer mounting parts 23 corresponds to the number of the buffers 40, and the buffer mounting part 23 has a size corresponding to the size of the buffer 40. The buffer mounting part 23 is concavely formed on the bolt movement path 21 in the longitudinal direction of the nut screw 50, such that the buffer 40 can be mounted in the buffer mounting part 23.

The buffer 40 is forced into the buffer mounting part 23. Therefore, the buffer 40 may be coupled to the buffer mounting part 23 without using a separate fastening tool, such that the product assembly time can be shortened to improve the productivity. Furthermore, the buffer 40 may be forced into the buffer mounting part 23, and thus prevented from being separated by a collision with the nut screw 50.

The bolt screw 30 is rotatably installed on the bolt movement path 21 of the booster body 20, has one side (right side based on FIG. 1) connected to the motor 10, and is rotated in one direction or the other direction by the operation of the motor 10.

The bolt screw 30 includes a bolt connection part 31, a bolt-embedded part 33 and a bolt screw thread part 35. The bolt connection part 31 is connected to the motor 10, and rotated in one direction or the other direction by the operation of the motor 10.

The bolt-embedded part 33 is extended from the bolt connection part 31, and mounted in the booster body 20. The bolt-embedded part 33 may be formed in a cylindrical shape, and rotated in the booster body 20. The bolt-embedded part 33 may be mounted so as to be restricted from moving on the booster body 20, such that the bolt screw 30 is restricted from moving in the longitudinal direction (the left side based on FIG. 3). Between the bolt-embedded part 33 and the booster body 20, a bearing may be mounted to reduce friction during rotation.

The bolt screw thread part 35 is extended from the bolt-embedded part 33. The bolt screw thread part 35 has a screw thread formed on the outer surface thereof, and is screwed to a nut body 51 of the nut screw 50. The nut body 51 of the nut screw 50 is moved in the longitudinal direction of the bolt screw thread part 35.

The buffer 40 is mounted on the booster body 20, and made of a material different from the booster body 20. In the present disclosure, the booster body 20 is made of a metallic material, and the buffer 40 is made of a plastic material having lower hardness and strength than the booster body 20.

The buffer 40 is disposed outside the nut screw 50 screwed to the bolt screw 30. The buffer 40 includes a buffer body 41, a rotation restriction part 43 and a stopper part 45.

The drawings show two buffers 40 disposed outside the nut screw 50, but the inventive concepts are not limited thereto.

The buffer 40 is made of a plastic material having preset hardness and strength. The preset hardness and strength of the buffer 40 are set to such an extent that the buffer 40 is not damaged even though the buffer 40 collides with the nut screw 50 a preset number of times (for example, 500,000 times) or more, and can restrict the movement of the nut screw 50.

The buffer body 41 is mounted on the buffer mounting part 23 of the booster body 20. The buffer body 41 is formed in a shape corresponding to the shape of the buffer mounting part 23, and forced into the buffer mounting part 23.

Since the buffer body 41 is forced into the buffer mounting part 23 without a separate fastening tool, the product assembly time can be shortened to improve the productivity. Furthermore, the buffer body 41 may be forced into the buffer mounting part 23, and thus prevented from being separated by a collision with the nut screw 50.

The rotation restriction part 43 is formed on the buffer body 41 so as to protrude toward the nut body 51 of the nut screw 50, and restricts the rotation of the nut screw 50.

The rotation restriction part 43 is constituted by a pair of rotation restriction parts spaced apart from each other by a larger distance than the width of the guide protrusion 53 of the nut screw 50. Therefore, the guide protrusion 53 may be locked to the rotation restriction parts 43 to restrict the rotation of the nut body 51, and the nut screw 50 may be linearly moved in the longitudinal direction of the bolt screw 30.

The stopper part 45 is installed on one side (right side based on FIG. 2) of the rotation restriction part 43, and restricts the movement of the nut screw 50 which is moved on the bolt screw 30 in the longitudinal direction of the bolt screw 30. That is, the nut screw 50, which is returned to the original position when braking is released, may be restricted from moving beyond a preset range, such that braking can be accurately performed.

In the present exemplary embodiment, the buffer body 41, the rotation restriction part 43 and the stopper part 45 are made of a plastic material. The buffer body 41, the rotation restriction part 43 and the stopper part 45 are made of a plastic material having preset hardness and strength. The preset hardness and strength are set to such an extent that the buffer 40 is not damaged even though the buffer 40 collides with the nut screw 50 a preset number of times (for example, 500,000 times) or more, and can restrict the movement of the nut screw 50.

The rotation of the nut screw 50 is restricted by the buffer 40, and the nut screw 50 is screwed to the bolt screw 30 and linearly moved in the longitudinal direction of the bolt screw 30. The nut screw 50 includes the nut body 51 and the guide protrusions 53.

The buffers 40 are disposed at a plurality of positions of the booster body 20, and the number of the guide protrusions 53 is equal to the number of the buffers 40. In the present embodiment, two buffers 40 and two guide protrusions 53 are provided.

The nut body 51 is screwed to the bolt screw thread part 35 of the bolt screw 30, and has a screw thread formed on the inner surface thereof, the screw thread corresponding to the screw thread of the bolt screw thread part 35. The guide protrusion 53 is formed on the outer surface of the nut body 51, and inserted into the rotation restriction part 43. The guide protrusion 53 is locked to the rotation restriction part 43 and restricted from rotating. Thus, the nut body 51 is not rotated by the rotation of the bolt screw thread part 35 of the bolt screw 30, but moved in the longitudinal direction of the bolt screw 30.

In the present exemplary embodiment, the booster body 20 may be made of aluminum to reduce the weight of a product, and the nut screw 50 may be made of steel to maintain the preset hardness and strength.

Figure 1:
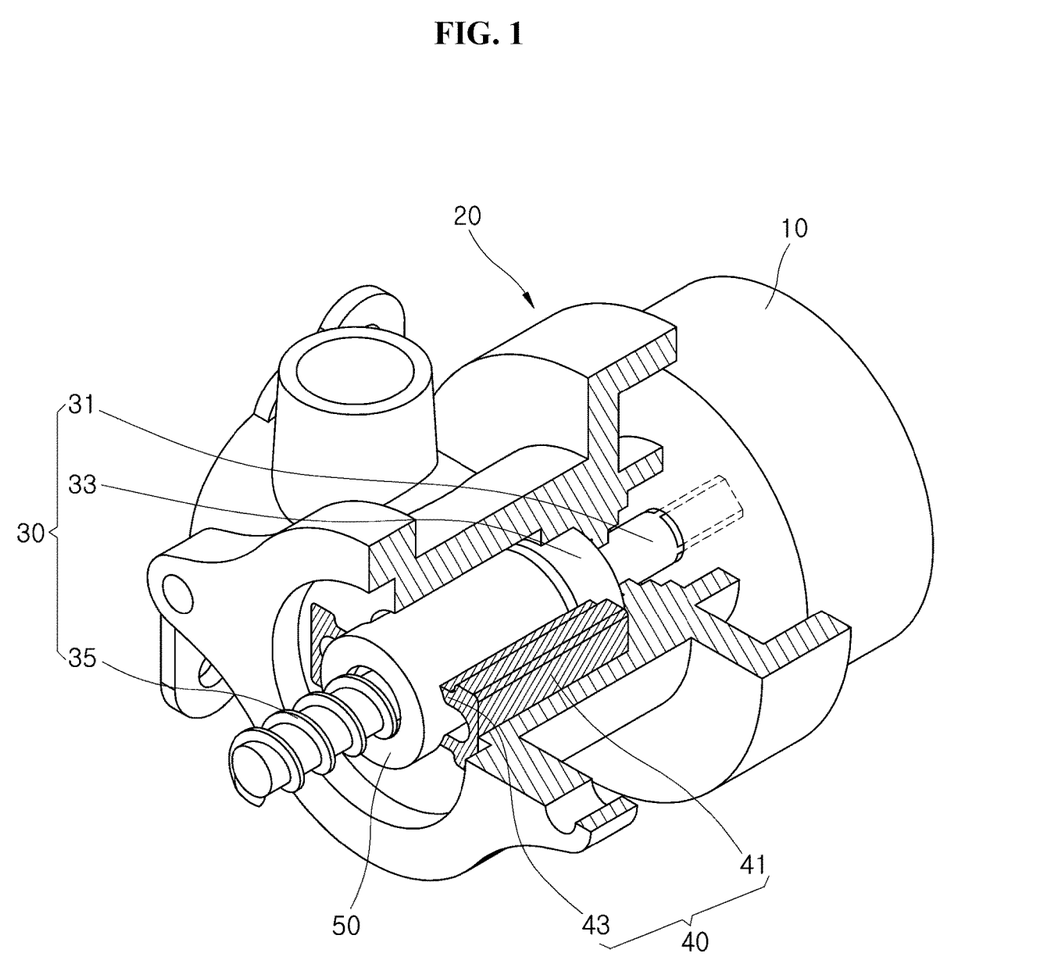
FIG. 1 is a partially exploded perspective view schematically illustrating an electric booster in accordance with an embodiment of the present invention.
Figure 2:
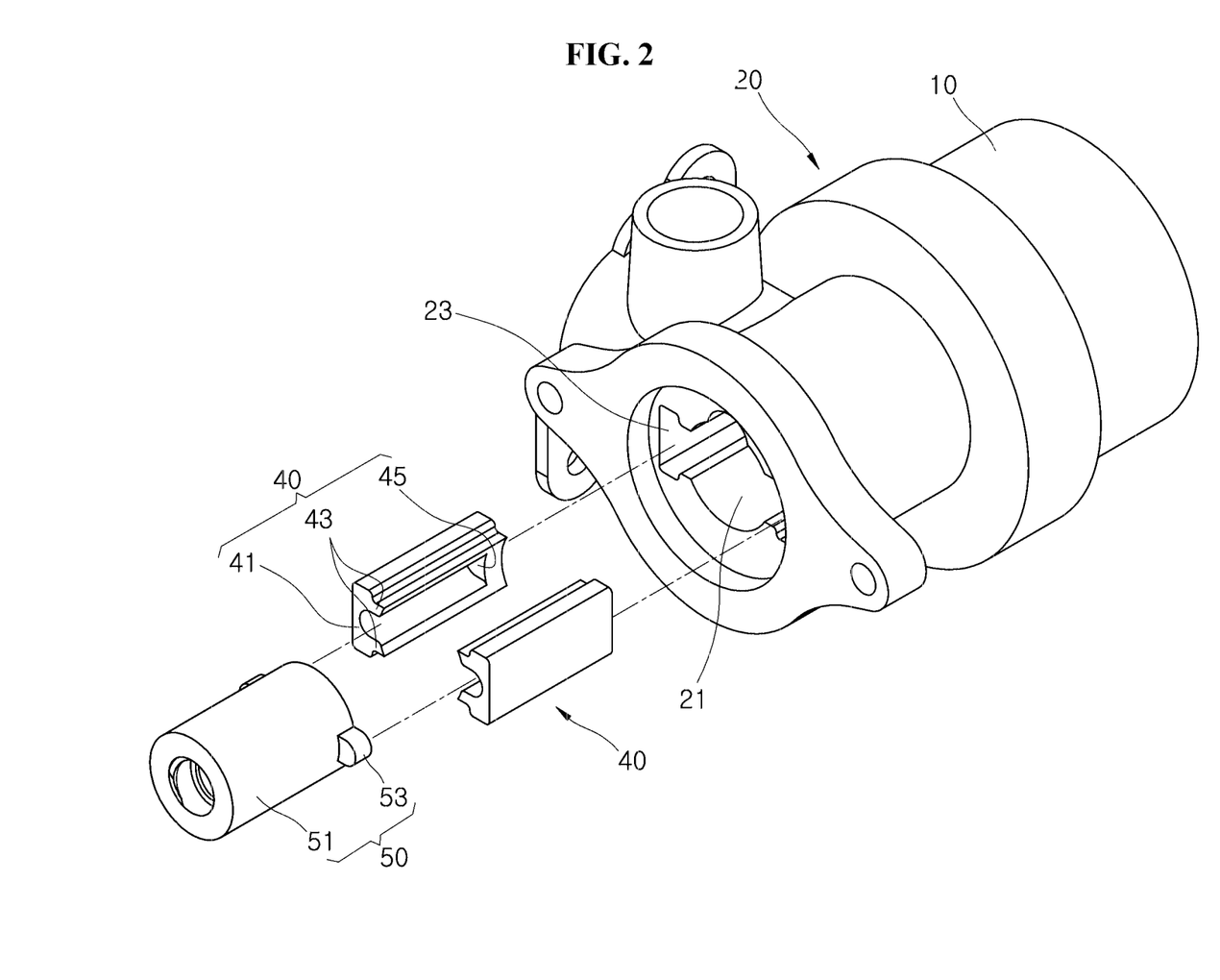
FIG. 2 is an assembled perspective view schematically illustrating the electric booster in accordance with the embodiment of the present invention.
Figure 3:
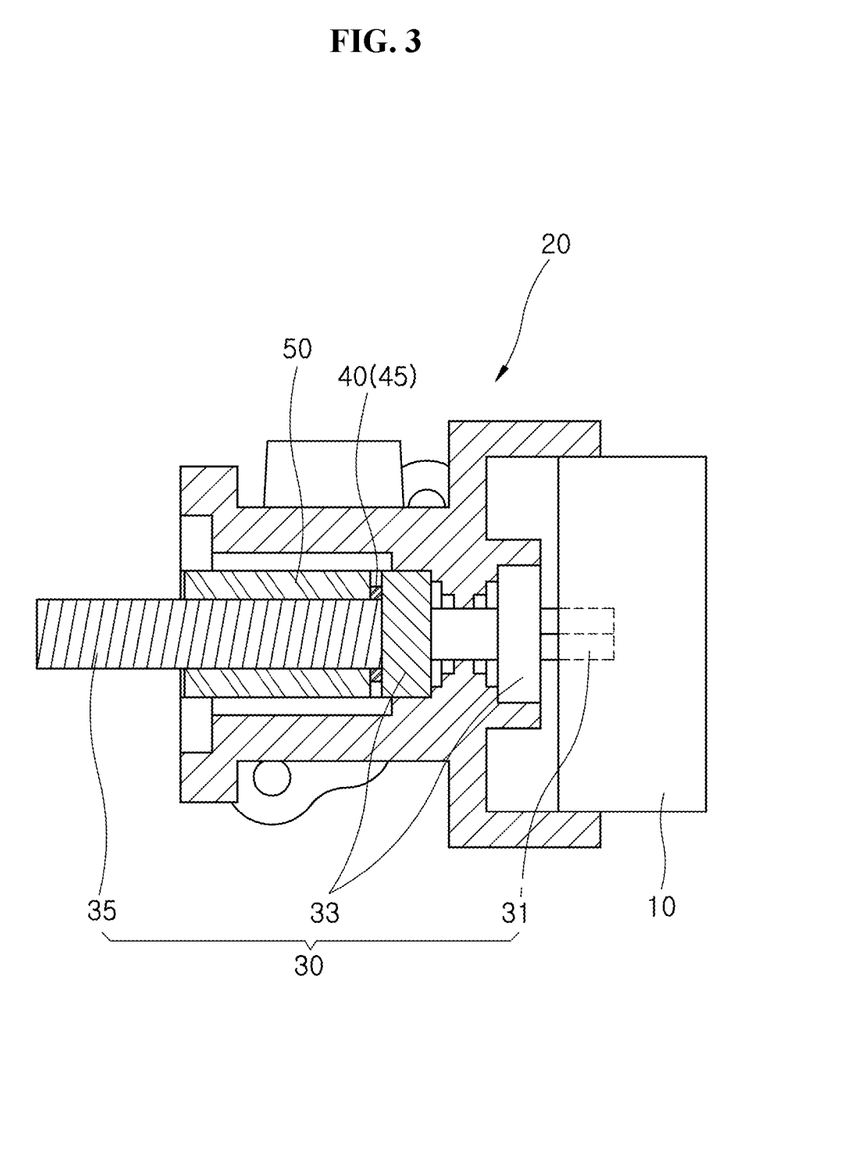
FIG. 3 is a cross-sectional view schematically illustrating the electric booster in accordance with the embodiment of the present invention.
Figure 4:
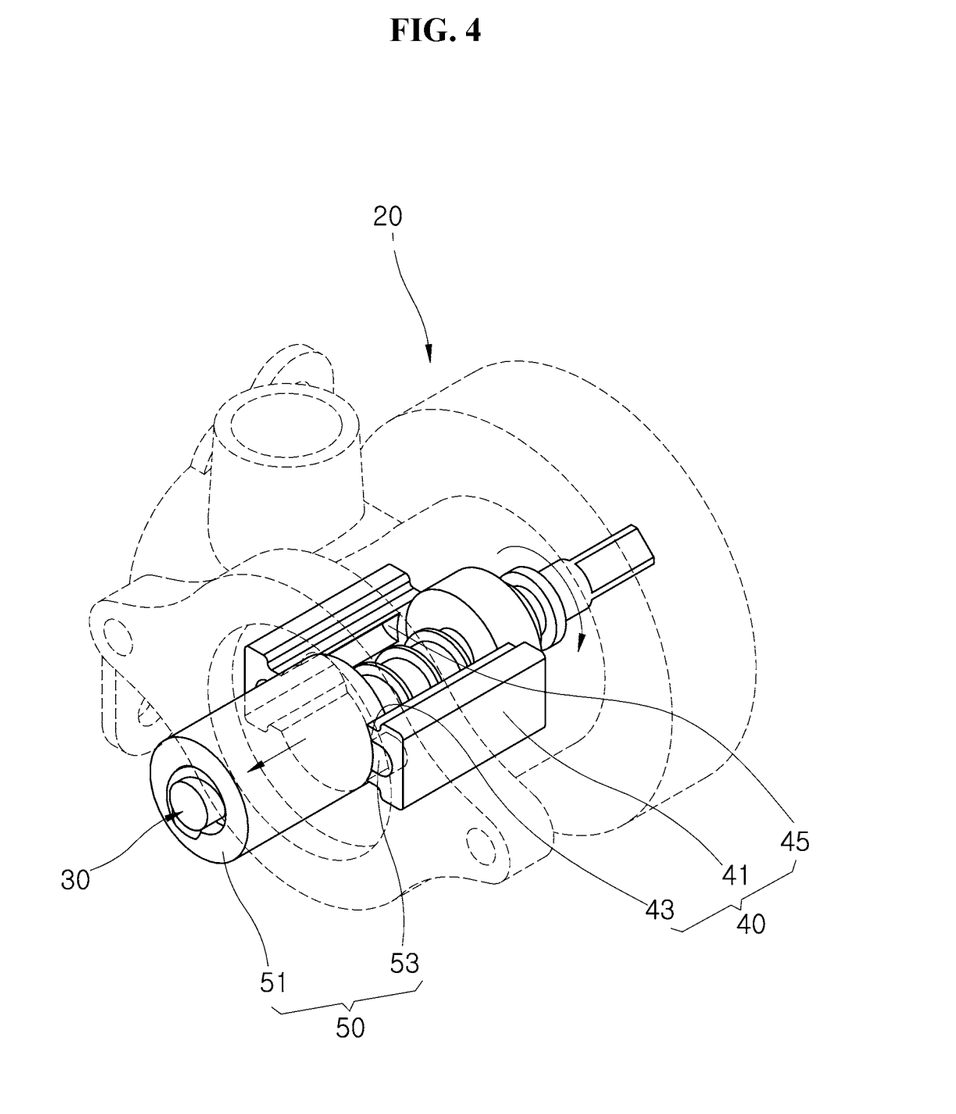
FIG. 4 is a perspective view schematically illustrating operations of a bolt screw, a nut screw and a buffer in accordance with the embodiment of the present invention during a braking operation.
Figure 5:
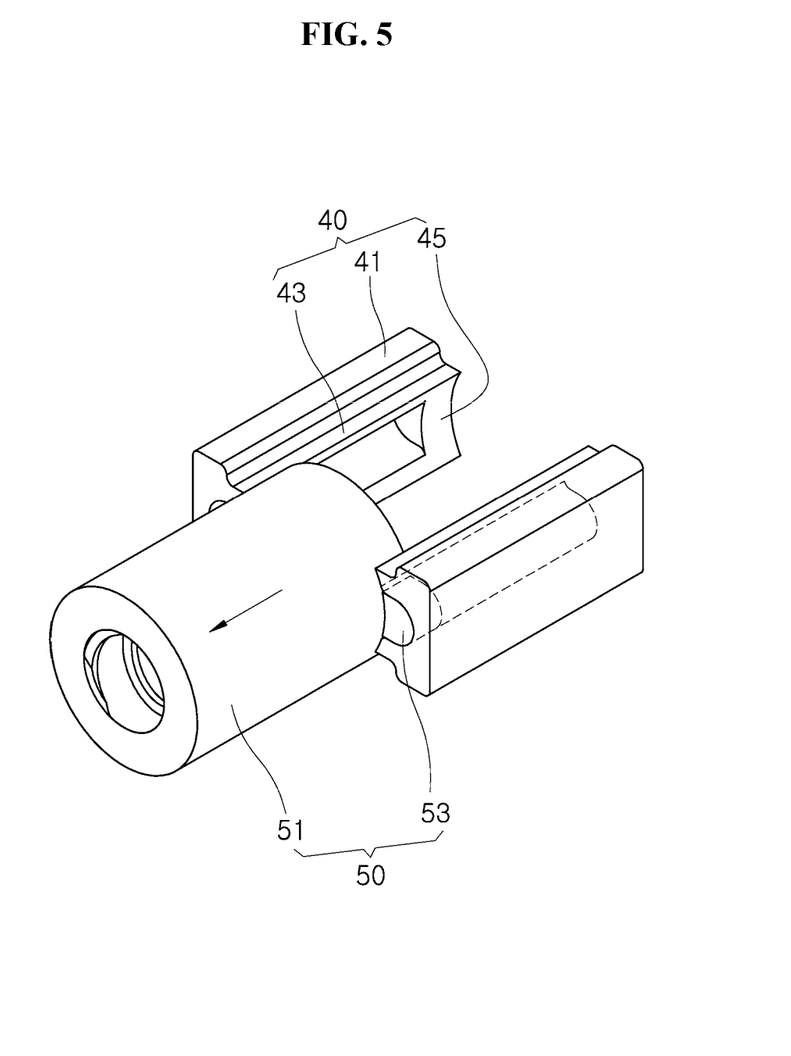
FIG. 5 is a perspective view schematically illustrating the operations of the nut screw and the buffer in accordance with the embodiment of the present invention during the braking operation.
Figure 6:
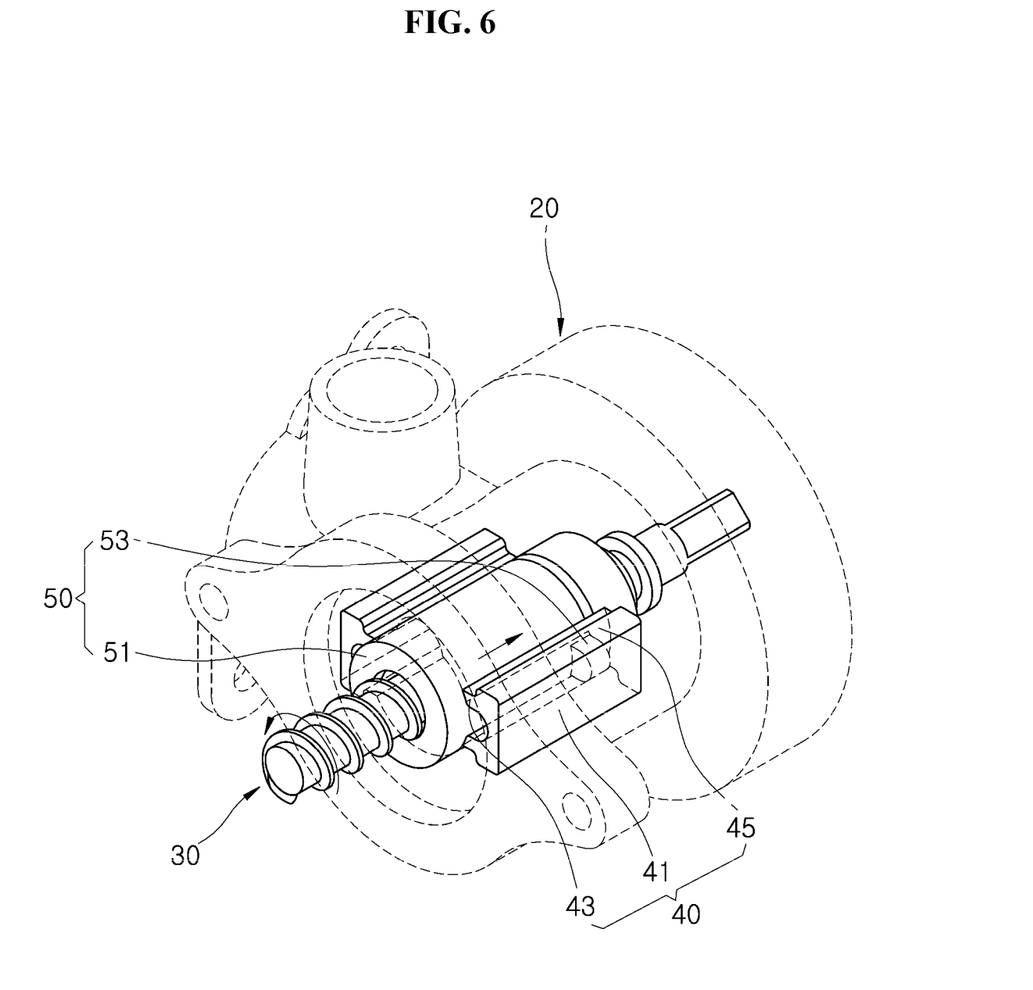
FIG. 6 is a perspective view schematically illustrating operations of the bolt screw, the nut screw and the buffer in accordance with the embodiment of the present invention during a braking release operation.
Figure 7:
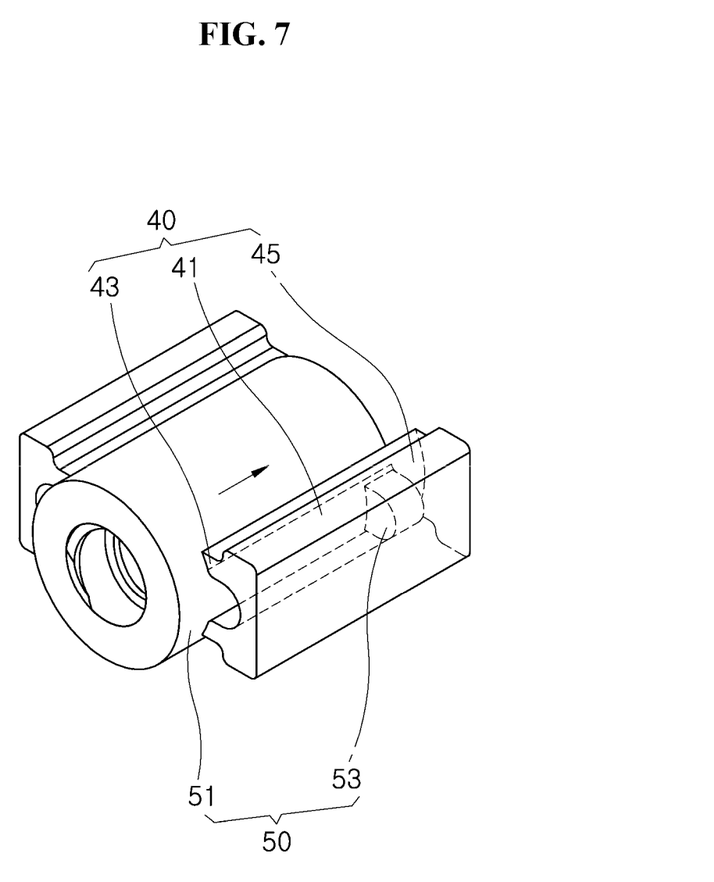
FIG. 7 is a perspective view schematically illustrating the operations of the nut screw and the buffer in accordance with the embodiment of the present invention during the braking release operation.

Referring to FIGS. 4 to 7, the operation of the electric booster in accordance with the embodiment of the present disclosure, which has the above-described configuration, will be described. FIGS. 4 and 5 illustrate a braking operation in the electric booster in accordance with an exemplary embodiment of the present invention, and FIGS. 6 and 7 illustrate a braking release operation in the electric booster in accordance with the embodiment of the present disclosure.

Referring to FIGS. 4 and 5, the bolt connection part 31 of the bolt screw 30 in the electric booster is rotated in one direction (clockwise direction based on FIG. 4) by the operation of the motor 10, during the braking operation.

With the rotation of the bolt connection part 31, the bolt screw thread part 35 is also rotated in one direction (clockwise direction based on FIG. 4), and the nut screw 50 screwed to the bolt screw thread part 35 is moved forward in the longitudinal direction of the bolt screw 30. At this time, the guide protrusions 53 of the nut screw 50 are locked to the rotation restriction parts 43 of the buffer 40 and restricted from rotating, and the nut body 51 is moved forward in the longitudinal direction of the bolt screw thread part 35.

Referring to FIGS. 6 and 7, the bolt connection part 31 of the bolt screw 30 in the electric booster is rotated in the other direction (counterclockwise direction based on FIG. 6) by the operation of the motor 10, during the braking release operation.

With the rotation of the bolt connection part 31, the bolt screw thread part 35 is also rotated in the other direction (counterclockwise direction based on FIG. 6), and the nut screw 50 screwed to the bolt screw thread part 35 is moved backward in the longitudinal direction of the bolt screw 30. At this time, the guide protrusions 53 of the nut screw 50 are locked to the rotation restriction parts 43 of the buffer 40 and restricted from rotating, and the nut body 51 is moved backward in the longitudinal direction of the bolt screw thread part 35.

As the backward movement of the nut body 51 is restricted by the stopper part 45 of the buffer 40, the nut body 51 may not be moved beyond a preset range, but be returned to the original position.

In accordance with an exemplary embodiment of the present invention, the buffer 40 may prevent a collision between the nut screw 50 and the booster body 20, such that the abrasion and damage of the nut screw 50 and the booster body 20 can be reduced to extend the lifetime of the electric booster.

Furthermore, the buffer 40 can reduce noise generation by preventing a collision between the nut screw 50 and the booster body 20, thereby providing a comfortable ride to a passenger in a vehicle.

Furthermore, the buffer 40 may restrict the movement of the nut screw 50 such that the nut screw 50 can be prevented from excessively moving and returned to the preset position.

Although exemplary embodiments of the present invention have been disclosed for illustrative purposes, those skilled in the art will appreciate that various modifications, additions and substitutions are possible, without departing from the scope and spirit of the disclosure as defined in the accompanying claims. Thus, the true technical scope of the inventive concepts should be defined by the following claims.

What is claimed is:

1. An electric booster for an automotive braking system comprising:
   a motor;
   a booster body coupled to the motor;
   a bolt screw rotatably installed in the booster body, connected to the motor, and configured to be rotated by the motor;
   a buffer mounted in the booster body and made of a material different from the booster body; and
   a nut screw restricted from rotating by the buffer, and screwed to the bolt screw so as to be linearly moved in the longitudinal direction of the bolt screw,
   wherein:
   the buffer comprises:
      a buffer body mounted on the booster body; and
      a rotation restriction part protruding from the buffer body and configured to restrict the rotation of the nut screw; and
   the booster body has a buffer mounting part comprising a pair of channels formed in the booster body in the longitudinal direction of the nut screw.

2. The electric booster of claim 1, wherein the buffer comprises a stopper part formed on the rotation restriction part, and configured to restrict the nut screw from moving beyond a preset range on the bolt screw.

3. The electric booster of claim 1, wherein the booster body is made of a metallic material, and the buffer is made of a plastic material.

4. The electric booster of claim 1, wherein the nut screw comprises:
   a nut body screwed to the bolt screw; and
   a guide protrusion protruding from the outer surface of the nut body, and inserted into the rotation restriction part.

5. The electric booster of claim 4, wherein the buffer is disposed at a plurality of positions of the booster body, and the number of the guide protrusions is equal to the number of the buffers.

6. The electric booster of claim 1, wherein the bolt screw comprises:
   a bolt connection part connected to the motor and rotated by the motor;
   a bolt-embedded part extended from the bolt connection part, and rotatably mounted on the body so as to be restricted from moving; and
   a bolt screw thread part extended from the bolt-embedded part and screwed to the nut screw.

7. The electric booster of claim 1, wherein
   the buffer body is forced into the buffer mounting part.

* * * * *